(12) United States Patent
Herrmann et al.

(10) Patent No.: US 11,440,109 B1
(45) Date of Patent: Sep. 13, 2022

(54) METAL STUD CUTTING BLADE AND RELATED MACHINES AND METHODS

(71) Applicant: The Steel Network, Inc., Durham, NC (US)

(72) Inventors: James E. Herrmann, Raleigh, NC (US); Edward R. diGirolamo, Raleigh, NC (US)

(73) Assignee: The Steel Network, Inc., Durham, NC (US)

( * ) Notice: Subject to any disclaimer, the term of this patent is extended or adjusted under 35 U.S.C. 154(b) by 290 days.

(21) Appl. No.: 15/847,656

(22) Filed: Dec. 19, 2017

Related U.S. Application Data

(60) Provisional application No. 62/436,215, filed on Dec. 19, 2016.

(51) Int. Cl.
  B23D 23/00 (2006.01)
  B23D 35/00 (2006.01)
  B26D 1/00 (2006.01)

(52) U.S. Cl.
  CPC .......... B23D 35/001 (2013.01); B23D 23/00 (2013.01); B23D 35/002 (2013.01); B26D 2001/006 (2013.01); Y10T 83/04 (2015.04); Y10T 83/9454 (2015.04)

(58) Field of Classification Search
  CPC .... B23D 23/00; B23D 35/001; B23D 35/002; B26D 2001/006; B26F 2001/4481; Y10T 83/9447; Y10T 83/9454; Y10T 83/9478
  USPC ...................................... 83/697, 699.11, 694
  See application file for complete search history.

(56) References Cited

U.S. PATENT DOCUMENTS

| | | | | |
|---|---|---|---|---|
| 2,776,003 | A * | 1/1957 | Koster | B23D 21/14 83/188 |
| 3,227,026 | A * | 1/1966 | Werntz | B23D 23/00 83/685 |
| 3,771,401 | A * | 11/1973 | Jasinski | B23D 23/00 83/453 |
| 3,989,575 | A * | 11/1976 | Davies et al. | B26D 9/00 156/355 |
| 4,218,946 | A * | 8/1980 | Witzler | B23D 23/00 83/636 |
| 4,293,236 | A * | 10/1981 | Shimizu | B41J 11/70 101/93.07 |
| 4,651,610 | A * | 3/1987 | Schwelling | B30B 9/3003 100/98 R |
| 4,732,068 | A * | 3/1988 | Yasuda et al. | B26D 5/08 83/575 |
| 5,090,285 | A * | 2/1992 | Kondo | B26D 1/0006 83/582 |
| 5,492,041 | A * | 2/1996 | Valkanov | B26F 1/18 83/133 |
| 6,418,826 | B1 * | 7/2002 | Suzuki et al. | A24B 3/06 30/357 |
| 6,752,289 | B1 * | 6/2004 | Lin | G07B 3/02 221/26 |

(Continued)

*Primary Examiner* — Clark F Dexter
(74) *Attorney, Agent, or Firm* — Jenkins, Wilson, Taylor & Hunt, P.A.

(57) ABSTRACT

A blade is configured for use in cutting metal studs, the blade including a cutting edge, the cutting edge configured to engage a metal stud such that the metal stud and debris from a cut of the metal stud are pushed in different directions. Cutting machines including the blade are also disclosed, as methods of cutting metal studs using the blade.

5 Claims, 7 Drawing Sheets

(56) References Cited

U.S. PATENT DOCUMENTS

| | | | | |
|---|---|---|---|---|
| 8,347,590 B2 * | 1/2013 | Goto | ............... | B65B 5/022 |
| | | | | 53/450 |
| 2007/0044613 A1 * | 3/2007 | Cohn | ............... | B26D 1/385 |
| | | | | 83/342 |
| 2014/0000217 A1 * | 1/2014 | Granili | ............... | B65B 61/065 |
| | | | | 53/329.2 |
| 2015/0283714 A1 * | 10/2015 | Sandefur | ............... | B26B 15/00 |
| | | | | 30/210 |
| 2017/0202176 A1 * | 7/2017 | Speter et al. | ............... | A01K 1/0152 |

* cited by examiner

METAL STUD CUTTING BLADE AND RELATED MACHINES AND METHODS

RELATED APPLICATIONS

The presently disclosed subject matter claims the benefit of U.S. Provisional Patent Application Ser. No. 62/436,215, filed Dec. 19, 2016, the disclosure of which is incorporated herein by reference in its entirety.

TECHNICAL FIELD

The subject matter disclosed herein relates generally to machines and methods for cutting metal studs. More particularly, the subject matter disclosed herein relates to metal stud cutting blades, and machines and methods employing the same.

BACKGROUND

Machines are available in the art to shear metal studs. Problems persist in the art with currently available cutting blades for the machines. Particularly, currently available blades can compromise and/or crush a shape of the metal stud. This is particularly problematic when it is desired to maintain the shape of the metal stud after it is cut. Further, debris that is generated from the cut can cause the jamming of the cutting machine tooling. Thus, the development of cutting blades represents a continuing and long-felt need in the art.

SUMMARY

In some embodiments, the presently disclosed subject matter provides a blade configured for use in cutting metal studs. In some embodiments, the blade comprises a cutting edge, the cutting edge configured to engage a metal stud such that the metal stud and debris from a cut of the metal stud are pushed in different directions. In some embodiments, the cutting edge comprises one or more cutting points, wherein the cutting points are configured to engage a metal stud such that the metal stud and debris from a cut of the metal stud are pushed in different directions. In some embodiments, the steel being separated in the different directions preserves the shape of the stud and/or prevents jamming of a machine comprising the blade.

In some embodiments, the presently disclosed subject matter provides a cutting machine for use in cutting metal studs. In some embodiments, the cutting machine comprises: a shaft; and a blade mounted to the shaft, the blade configured for use in cutting metal studs, the blade comprising a cutting edge, the cutting edge configured to engage a metal stud such that the metal stud and debris from a cut of the metal stud are pushed in different directions. In some embodiments, the cutting edge comprises one or more cutting points, wherein the cutting points are configured to engage a metal stud such that the metal stud and debris from a cut of the metal stud are pushed in different directions. In some embodiments, the steel being separated in the different directions preserves the shape of the stud and/or prevents jamming of a machine comprising the blade.

In some embodiments, a method of cutting a metal stud is provided. In some embodiments, the method comprises: providing a cutting machine for use in cutting metal studs, the cutting machine comprising: a shaft; and a blade mounted to the shaft, the blade configured for use in cutting metal studs, the blade comprising a cutting edge, the cutting edge configured to engage a metal stud such that the metal stud and debris from a cut of the metal stud are pushed in different directions; and cutting a metal stud with the blade in the cutting machine. In some embodiments, the cutting edge comprises one or more cutting points, wherein the cutting points are configured to engage a metal stud such that the metal stud and debris from a cut of the metal stud are pushed in different directions. In some embodiments, the steel being separated in the different directions preserves the shape of the stud and/or prevents jamming of a machine comprising the blade.

Accordingly, it is an object of the presently disclosed subject matter to provide a blade configured for use in cutting metal studs.

Although some of the embodiments of the presently disclosed subject matter having been stated hereinabove, and which are achieved in whole or in part by the presently disclosed subject matter, other embodiments will become evident as the description proceeds hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1A:
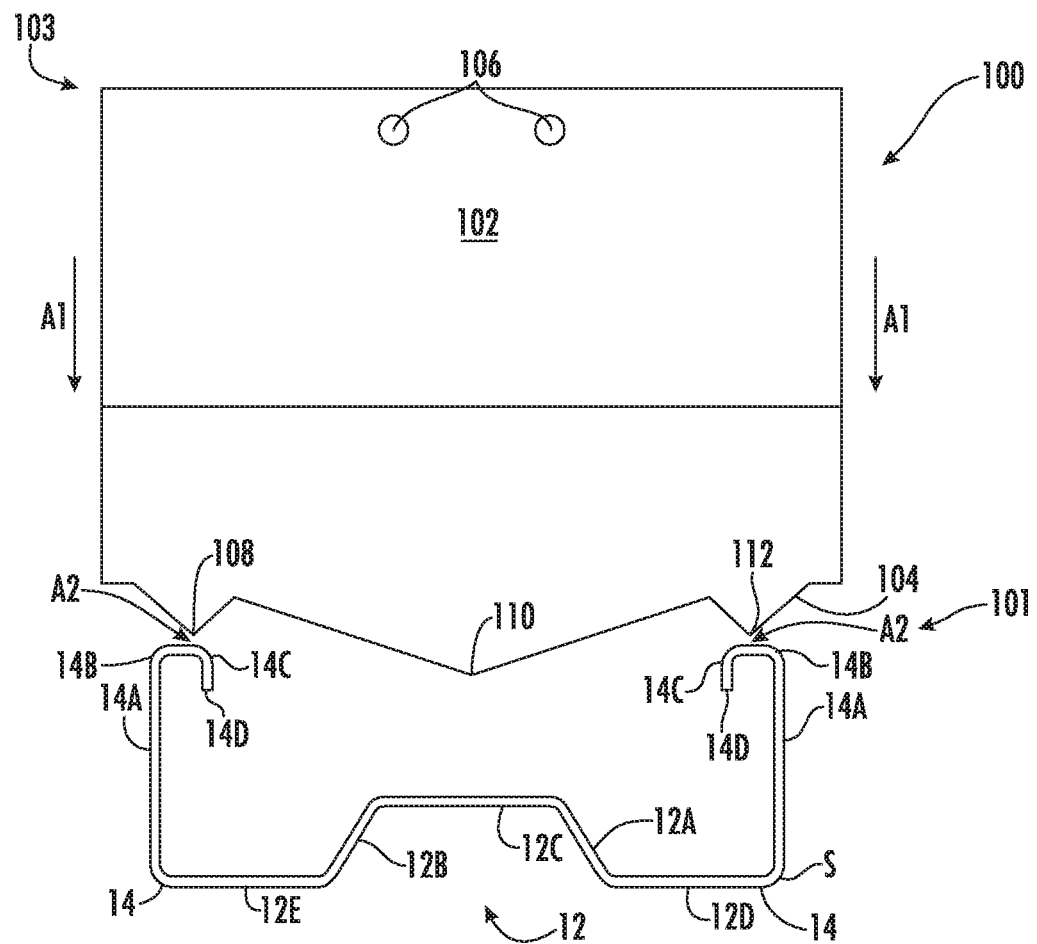
FIGS. 1A-1H are a series of schematic plan views showing a blade configured for use in cutting metal studs in accordance with the presently disclosed subject matter as it can be employed in cutting metal studs have different cross-sectional profiles.

The features and advantages of the present subject matter will be more readily understood from the following detailed description which should be read in conjunction with the accompanying drawings that are given merely by way of explanatory and non-limiting example.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a," "an," and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising," which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

Unless otherwise indicated, all numbers expressing quantities of temperature, time, weight, volume, concentration, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value is meant to encompass variations of, in one example ±20% or ±10%, in another example ±5%, in another example ±1%, and in still another example ±0.1% from the specified amount, as such variations are known to be appropriate to perform the disclosed methods. Additionally, the term "substantially" includes not only the specified amount, but can include, for example, ±20%, ±15%, ±10%, ±5%, ±1%, and ±0.5%, as may be readily understood by those having ordinary skill in the art.

Numerical ranges recited herein by endpoints include all numbers and fractions subsumed within that range (e.g. 1 to 5 includes, but is not limited to, 1, 1.5, 2, 2.75, 3, 3.90, 4, and 5).

The presently disclosed subject matter pertains to a new blade configured to cut metal studs, such as a metal stud available under the registered trademark SIGMASTUD® from The Steel Network, Durham, N.C., United States of America. Referring to FIGS. 1A-1H and 2, a blade in accordance with some embodiments of the presently disclosed subject matter is referred to generally at 100. Blade 100 comprises a heel 102 and a cutting edge 104. Cutting edge 104 is present at a first end 101 of heel 102 that is configured to be adjacent to a stud S to be cut, when blade 100 is deployed in the direction of arrows A1. Heel 102 includes bores 106 at a second end 103 of heel 102 configured to be installed into a cutting machine 200. That is, bores 106 are configured to receive any suitable hardware for mounting or installing blade 100 into a cutting machine 200. See FIG. 2.

Continuing with particular reference to FIGS. 1A-1H, cutting edge 104 is configured to engage a metal stud S such that the metal stud S and debris DS from a cut of the metal stud S are pushed in different directions, such as away from each other. In some embodiments, cutting edge 104 comprises one or more cutting points. In the example show in FIG. 1, cutting edge 104 comprises first, second, and third cutting points 108, 110 and 112, wherein first, second, and third cutting points 108, 110 and 112 are configured, for example, using angles and locations along cutting edge 104, to engage a metal stud S such that the metal stud S and debris DS (see FIGS. 1B, 10, 1F, 1G) from a cut of the metal stud S are pushed away in different directions, such as away from each other. By way of example, first and third cutting points 108 and 112 can contact metal stud S at arrows A2, but are also respectively configured at an angle relative to second cutting point 110. This provides a representative, non-limiting example of a configuration to engage a metal stud S such that the metal stud S and debris DS from a cut of the metal stud S are pushed away in different directions, such as away from each other. Upon a review of the present disclosure, one of ordinary skill in the art would appreciate that the cross-sectional profile of a stud S can be used to alter configurations of blade 100, such that the metal stud S and debris DS from a cut of the metal stud S are pushed away in different directions, such as away from each other.

Figure 1B:
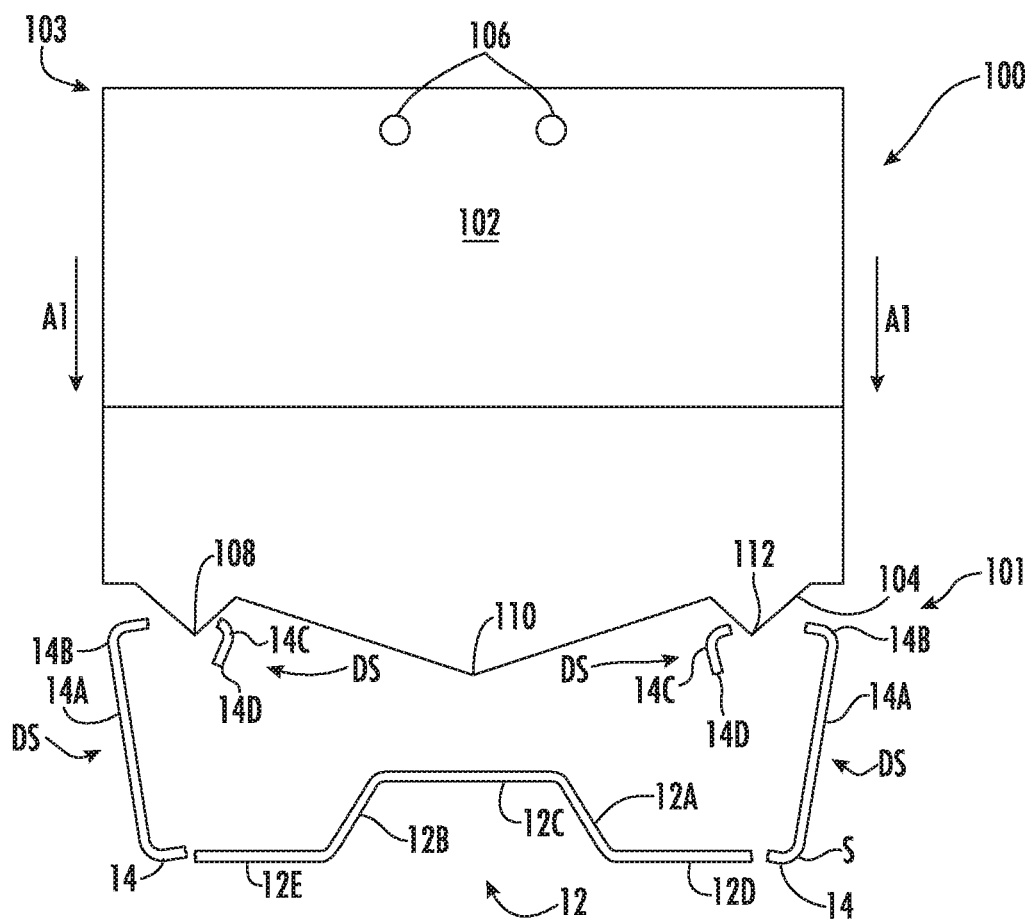

Continuing with particular reference to FIGS. 1A and 1B, in some embodiments, SIGMASTUD® metal stud S has an open construction and basically comprises a web indicated generally by the numeral 12 and a pair of opposed flanges indicated generally by the numeral 14. By open construction it is meant that the metal stud S is not closed but includes an opening formed in the back of the stud S. With respect to the flanges, each flange 14 is of a generally J-shape. It should be appreciated that the J-shaped configuration of the flange 14 forms a part of a particular embodiment disclosed herein but that the shape of the flange 14 may vary.

Continuing with reference to FIGS. 1A and 1B, flange 14 includes a side 14A. Side 14A extends from the front of the stud S to the back of the stud S. Extending inwardly from side 14A is a back or lip 14B. For purposes of reference backs 14B of the two flanges 14 form the back extremity of metal stud S. Extending from the back 14B, towards the web 12, is a turned end 14C; Turned end 14C includes a terminal end 14D. Consequently, for this particular embodiment, each flange 14 forms a generally J-shape. Further, the turned end 14C extends generally parallel with the side 14A of each flange 14. Now turning to a discussion of web 12, it is seen that web 12 extends between the two flanges 14 and for purposes of reference, the web 12 forms the front of metal stud S. A channel or channel depression is formed centrally in the web 12 and extends continuous from one end of metal stud S to the other end of the metal stud S. This central channel includes a pair of diagonal sides or side sections 12A and 12B. Extending between diagonal sides 12A and 12B is a section 12C that happens to be a center section in this case. Because the channel is centrally located in the web 12, there is defined a pair of outer raised surfaces or sections 12D and 12E, as viewed in FIGS. 1A and 1B, on opposite sides of the channel. Surfaces 12D and 12E form a part of the web 12 and in this case are coplanar. Also, each surface or section 12D or 12E is disposed at an angle generally normal to the side 14A of the adjacent flange 14.

As also shown in FIGS. 1C-1H, in some embodiments, blade 100 can be configured to cut other metal studs S' comprising web 12' and flanges 14' comprising double return stiffener parts as well as metal studs S" comprising web 12" and flanges 14" comprising single stiffener parts (e.g., single lip) and studs 5'" comprising web 12'" and flanges 14'" comprising no stiffener parts (e.g., no lip).

Figure 1C:
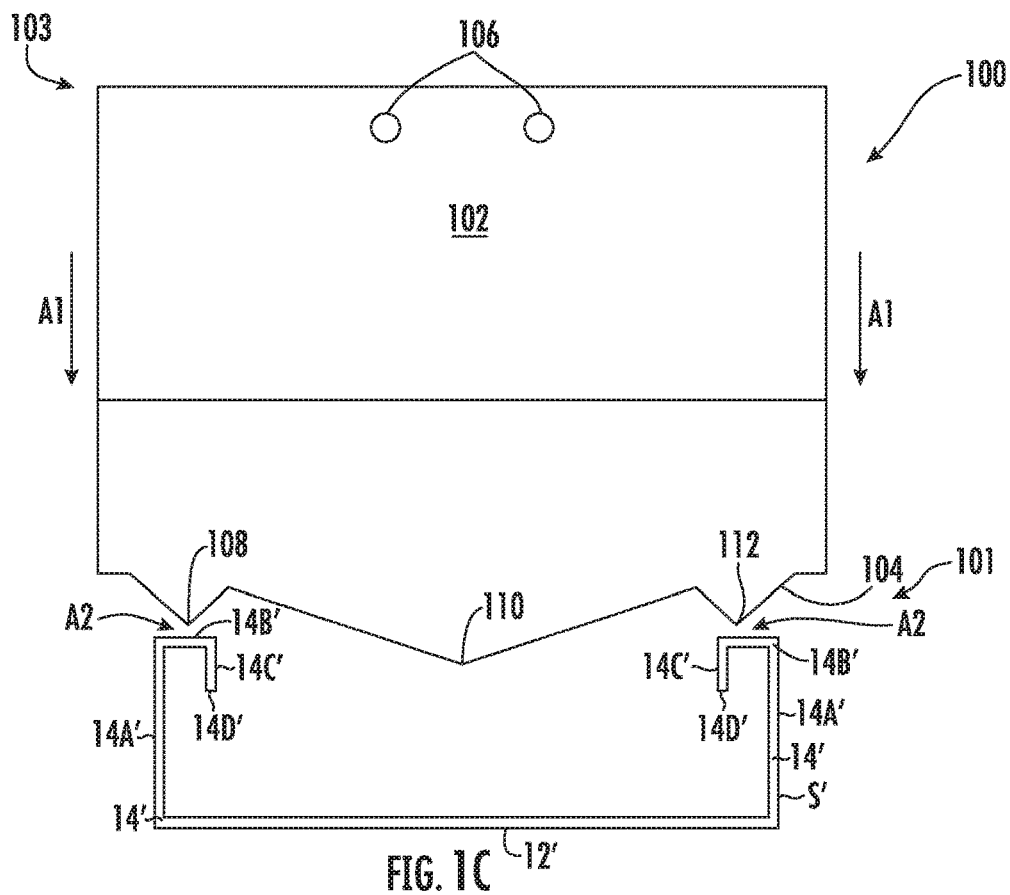
Figure 1D:
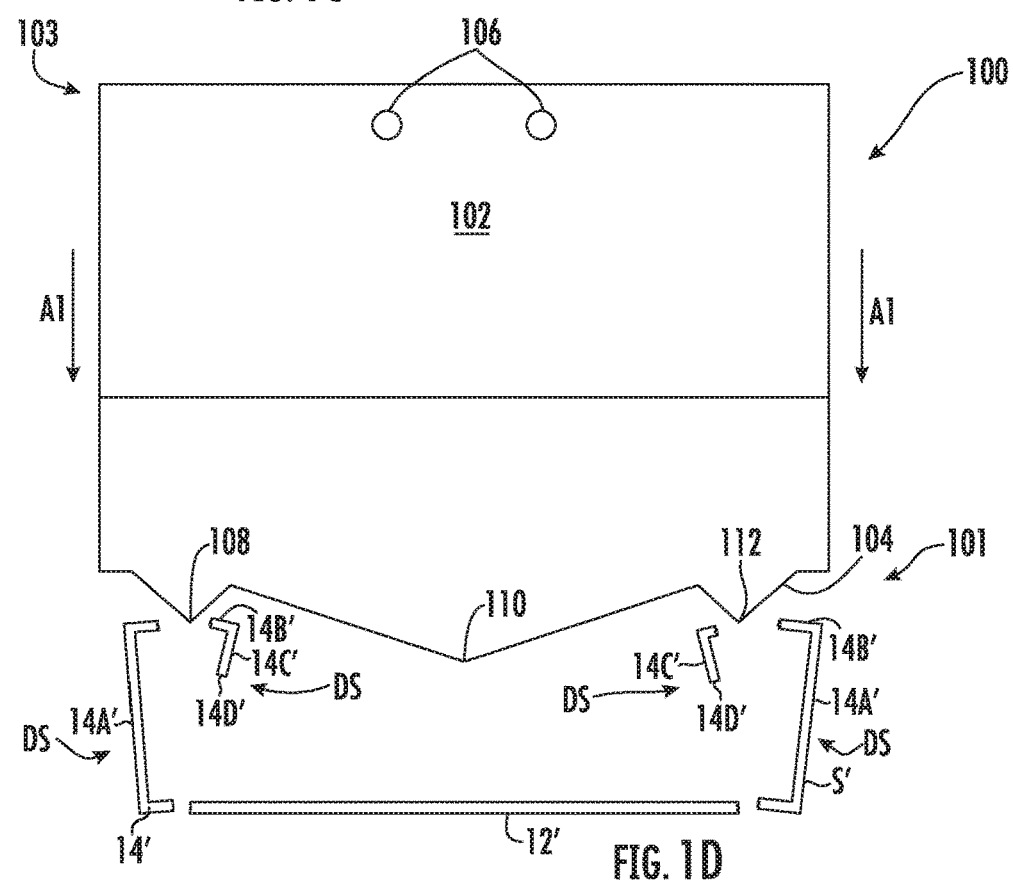

Continuing with reference to FIGS. 1C and 1D, flange 14' includes a side 14A'. Side 14A' extends from the front of the stud S' to the back of the stud S'. Extending inwardly from side 14A' is a back or lip 14B'. For purposes of reference backs 14B' of the two flanges 14' form the back extremity of metal stud S'. Extending from the back 14B', towards the web 12', is an angled end 14C'. Angled end 14C' includes a terminal end 14D'. Consequently, for this particular embodiment, each flange 14' forms a generally L-shape. Further, the angled end 14C' extends generally parallel with the side 14A' of each flange 14'. Now turning to a discussion of web 12', it is seen that web 12' extends between the two flanges 14' and for purposes of reference, the web 12' forms the front of metal stud S'.

Figure 1E:
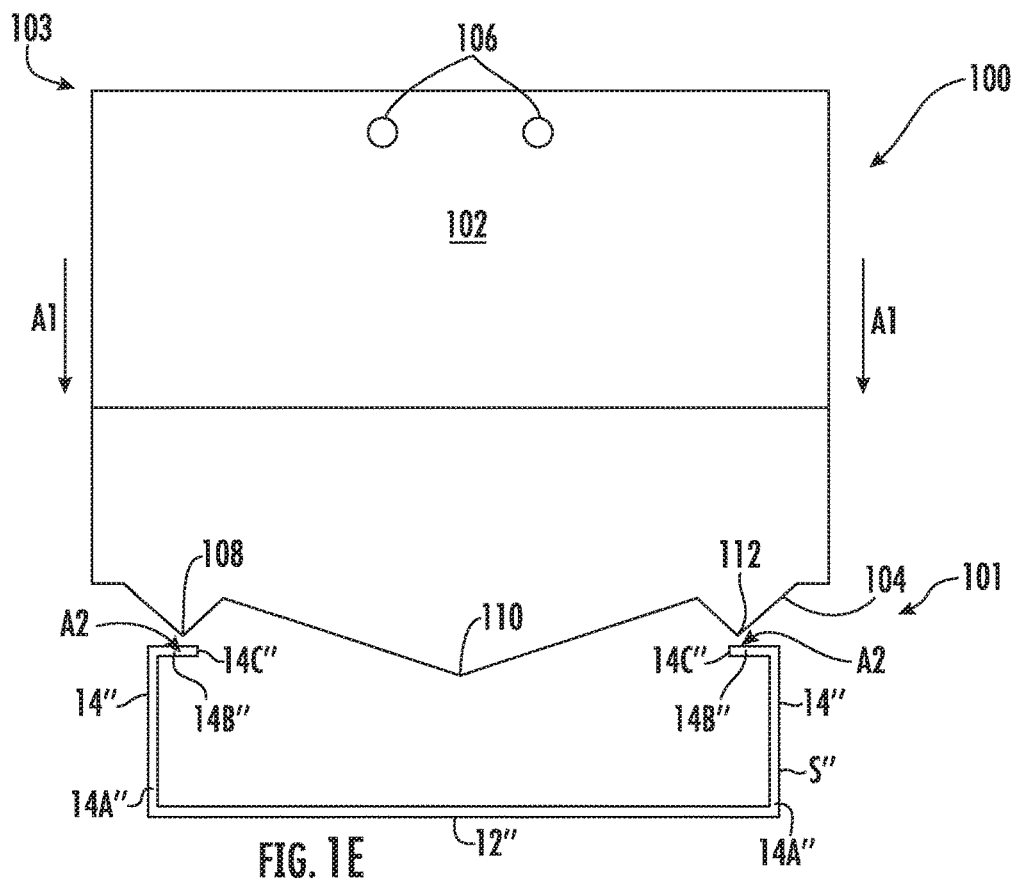
Figure 1F:
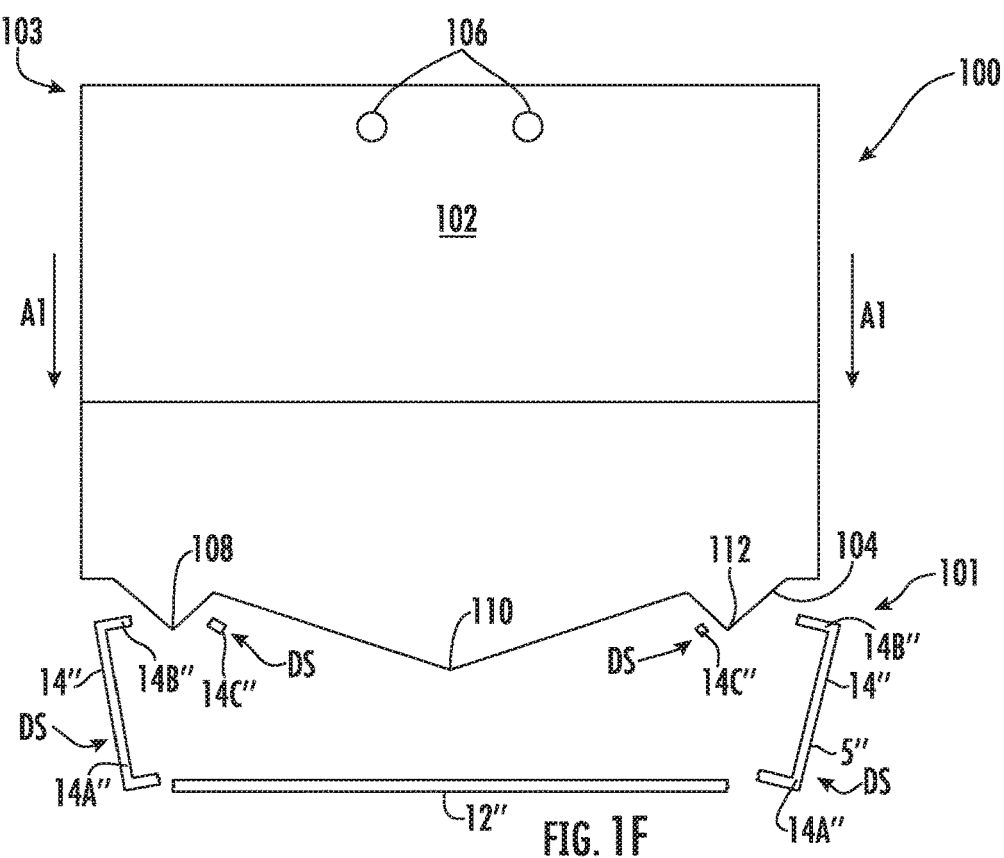

Continuing with reference to FIGS. 1E and 1F, flange 14" includes a side 14A". Side 14A" extends from the front of the stud 5" to the back of the stud 5". Extending inwardly from side 14A" is a back or lip 14B". For purposes of reference backs 14B" of the two flanges 14" form the back extremity of metal stud 5". Back 14B" includes a terminal end 14C". Consequently, for this particular embodiment, each flange 14" forms a generally L-shape. Now turning to a discussion of web 12", it is seen that web 12" extends between the two flanges 14" and for purposes of reference, the web 12" forms the front of metal stud 5".

Figure 1G:
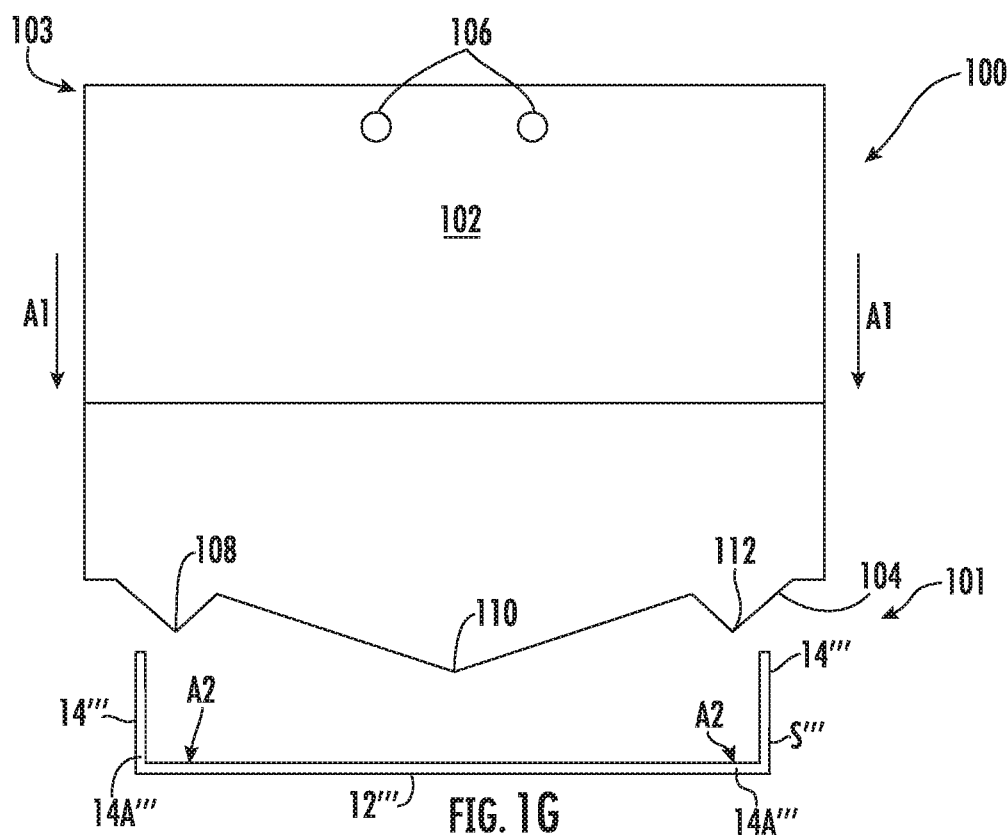
Figure 1H:
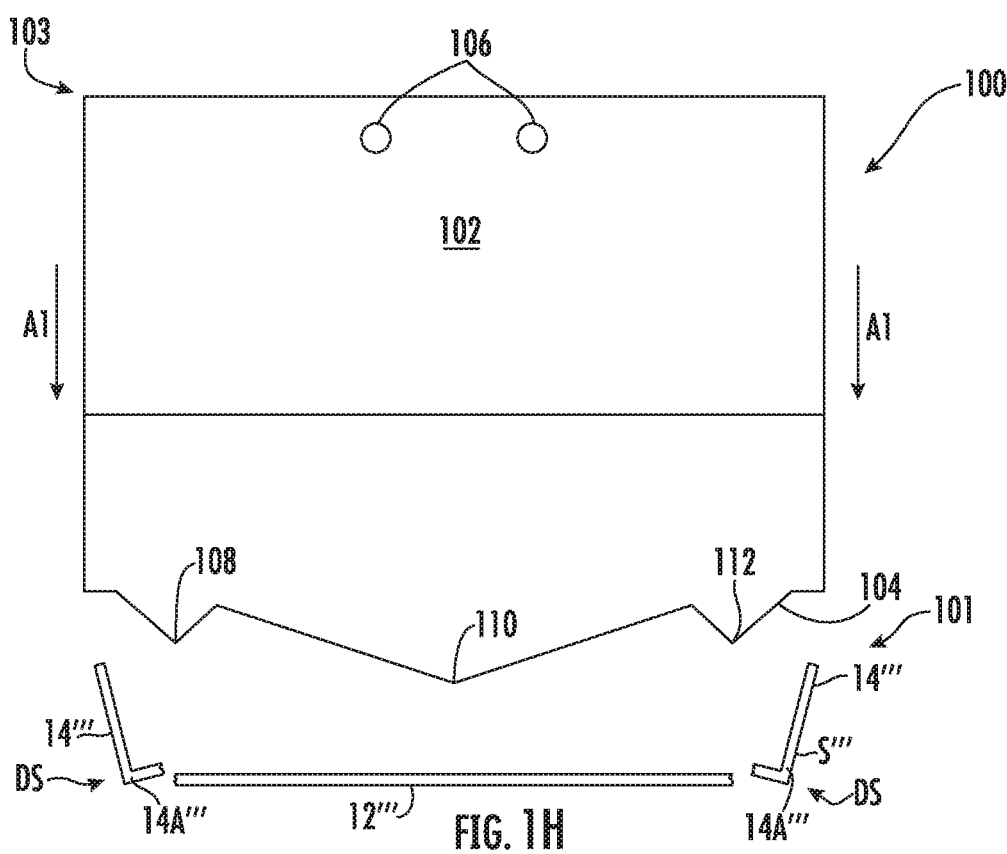
Figure 2:
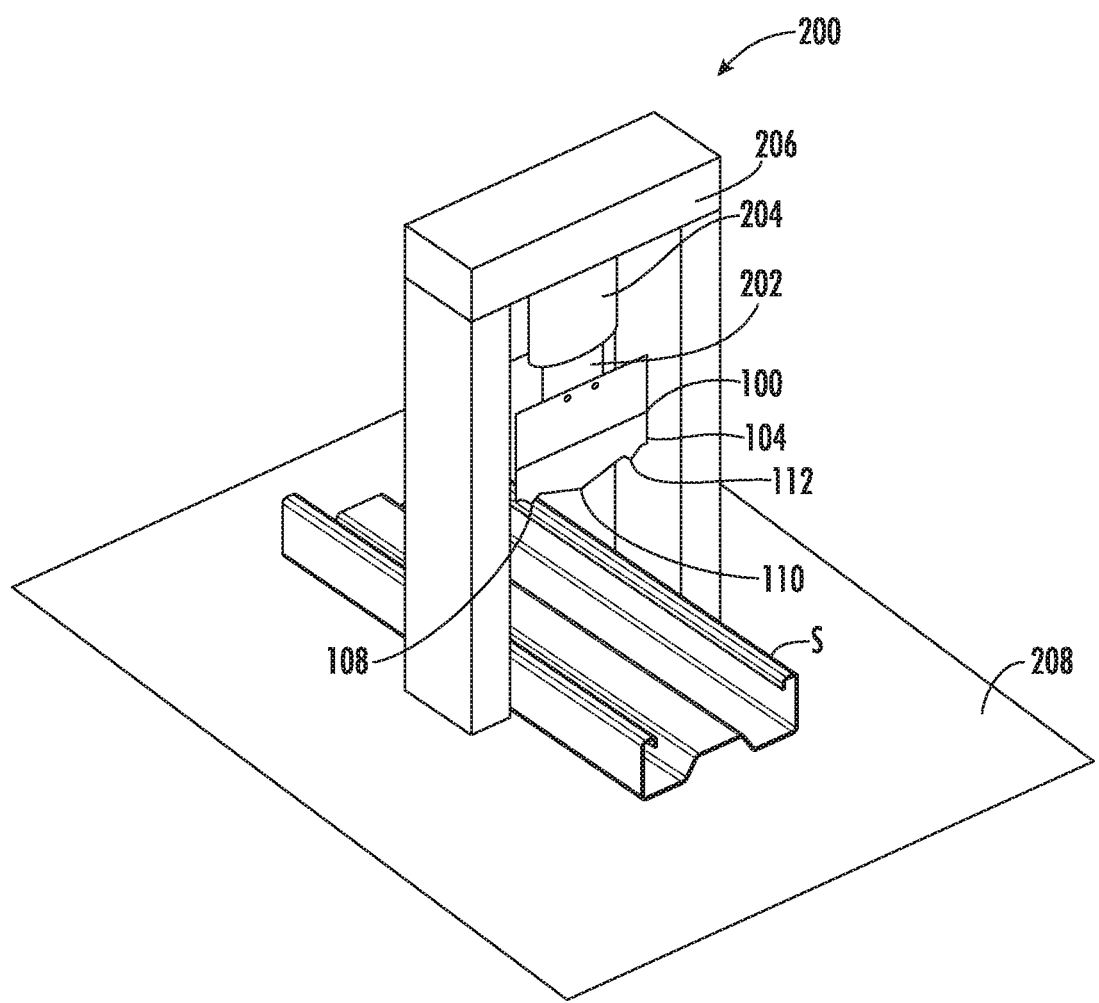
FIG. 2 is a schematic perspective view showing a cutting machine comprising a blade configured for use in cutting metal studs in accordance with the presently disclosed subject matter in use in cutting a metal stud.

Continuing with reference to FIGS. 1G and 1H, flange 14'" includes a side 14A'". Side 14A'" extends from the front of the stud 5'" to the back of the stud Sm. Now turning to a discussion of web 12'", it is seen that web 12'" extends between the two flanges 14'" and for purposes of reference, the web 12'" forms the front of metal stud Sm.

Thus, in some embodiments, a cutting machine 200 comprising a cutting blade 100 as disclosed herein is configured to shear a metal stud S. Referring to FIGS. 1A-1H and 2, according to some embodiments of the presently disclosed subject matter, cutting machine 200 comprises the blade 100 that pierces the return lip 14B (or lip 14B' in the case of stud S') and pushes the steel away from the debris or slice DS of steel that is discarded. Without this steel being separated in the two directions the shape can be compromised and crushed and the machine tooling can be jammed-up. Cutting machines 200 are commercially available, as would be apparent to one of ordinary skill in the art upon a review of the instant disclosure. Cutting machine comprises shaft 202, motor 204 and control panel 206. Blade 100 can be mounted on shaft 202, or otherwise installed in machine 200. Shaft 202, motor 204 and control panel 206 are operably linked such that an operator can deploy blade 100 downwardly in the cutting of stud S via controls on control panel 206. Stud S is placed on a platform 208 for cutting. Cutting machine 200 can further comprise jigs, guards, and other tooling (not shown in FIG. 2) as might be desired and as are also commercially available, as would be apparent to one of ordinary skill in the art upon a review of the instant disclosure.

The cutting machine 200 and/or cutting blade 100 in accordance with the presently disclosed subject matter can be used to make any desired cuts of a metal stud. For example, The cutting machine 200 and/or cutting blade 100 can be used to cut a metal stud into desired lengths for a variety of desired end uses.

Figure 3:
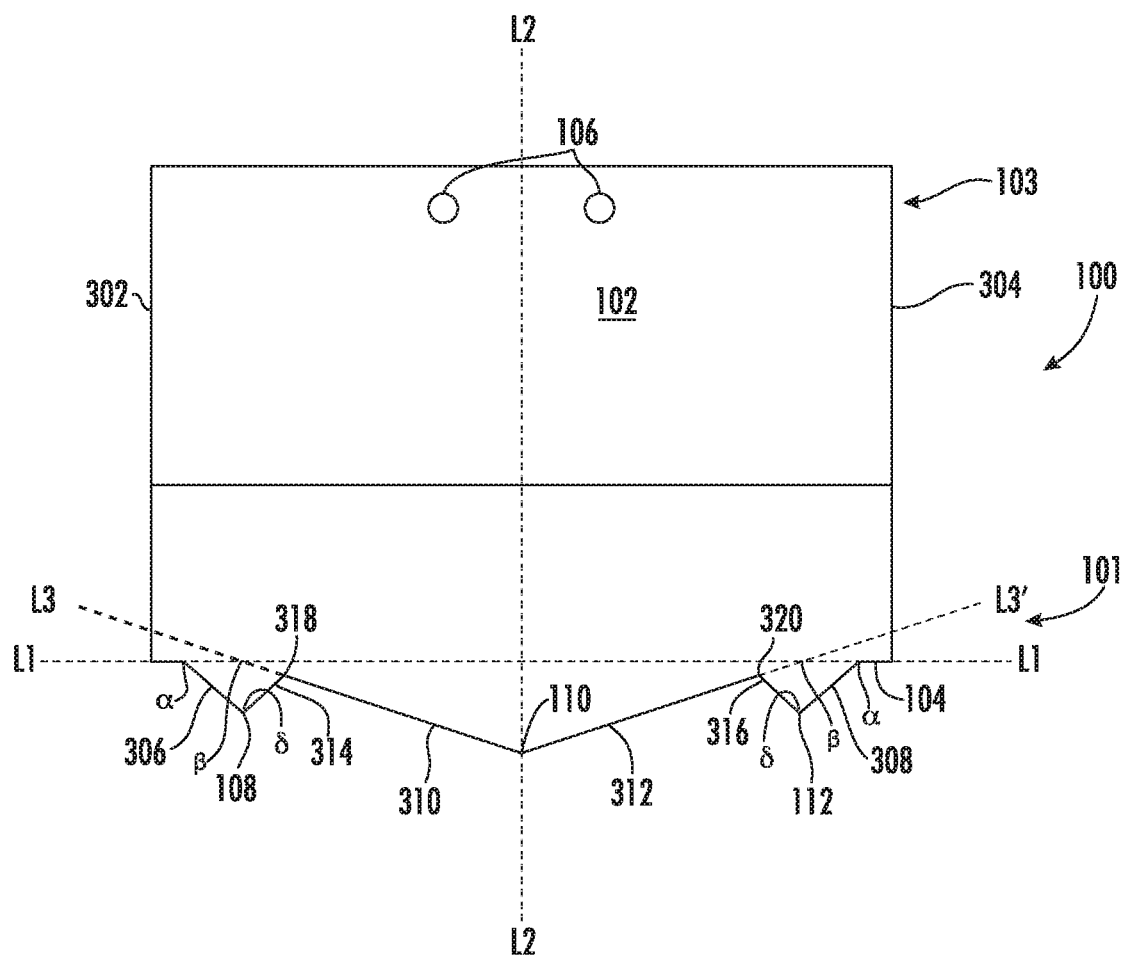
FIG. 3 is a schematic plan view showing a blade configured for use in cutting metal studs in accordance with the presently disclosed subject matter.

Referring to FIG. 3, a representative embodiment of cutting edge 104 of blade 100 is described in more detail. In some embodiments, blade 100 is generally rectangular, with a first end 101 and a second end 103, and two peripheral sides 302 and 304. Cutting edge 104 is present at first end 101 of blade 100 and proceeds in segments from first peripheral side 302 to second peripheral side 304. A first segment 306 of cutting edge 104 tapers away from first peripheral side 302 at an angle alpha defined between reference line L1-L1 and first cutting point 108. A second segment 308 of cutting edge 104 tapers away from the opposing second peripheral side 304 at a similar angle alpha and ends at third cutting point 112, which provides in effect a mirror image of the taper to first cutting point 108. Indeed, blade 100, in some embodiments, exhibits a bilateral symmetry along the line L2-L2 in FIG. 3. In some embodiments, first and second segments 306, 308 of cutting edge 104 taper from sides 302, 304 to first and third cutting points 108, 112 at an obtuse angle. The particular value of angle alpha at which sides 302, 304 taper to first and third cutting points 108, 112 can be selected based on the particular parameters of the stud to be cut. In some embodiments, for example, the angle can be selected based on the material from which metal stud S is formed and/or the dimensions of the elements of flange 14 (e.g., width of backs 14B, thickness of sides 14A, etc.).

Continuing with reference to FIG. 3, third and fourth segments 310, 312 of cutting edge 104 taper away from first peripheral side 302 and second peripheral side 304, respectively, at a second angle beta defined by reference lines L1-L1 and L3, L3' and end at second cutting point 110. In some embodiments, the angle beta is also an obtuse angle, the value for which can be selected based on the particular parameters of the stud to be cut. In some embodiments, second cutting point 110 lies at a medial point of cutting edge 104 along line L2-L2. First and third cutting points 108 and 112 are further defined by fifth and sixth cutting edge segments 314, 316 that taper away from first end 101 back toward the second end 103 and toward the center line L2-L2 of blade 100 at an angle gamma that can be defined with reference to first and second segments 306, 308 and fifth and sixth cutting edge segments 314, 316, respectively. This angle can range from an acute angle to a right angle to an obtuse angle. The particular value of angle gamma can be selected based on the particular parameters of the stud to be cut. First and second segments 306, 308 and fifth and sixth cutting edge segments 314, 316 intersect at points 318, 320. In some embodiments, points 318, 320 are spaced away from line L1-L1 towards first end 101 of blade 100. In some embodiments, points 318, 320 can lie on line L1-L1.

Regardless of the particular size and relative positioning of the segments of blade 100, blade 100 is configured to engage a metal stud such that the metal stud and debris from a cut of the metal stud are pushed in different directions. Specifically, with reference again to the elements identified in FIG. 3, blade 100 is configured such that metal stud S and debris DS from a cut of the metal stud S are pushed away in different directions, such as away from each other. In particular, in some embodiments, first cutting point 108 is configured such that debris DS is pushed in a direction of fifth cutting edge segment 314 (e.g., towards second peripheral side 304), whereas the remaining portion of stud S from which debris DS is cut is pushed in a direction of first segment 306 (e.g., towards first peripheral side 302). Similarly, third cutting point 112 can be configured such that debris DS is pushed in a direction of sixth cutting edge segment 316 (e.g., towards first peripheral side 302), whereas the remaining portion of stud S from which debris DS is cut is pushed in a direction of second segment 308 (e.g., towards second peripheral side 304). Likewise, second cutting point 110 can be configured such that a portion of stud S on a first side of center line L2-L2 of blade 100 is displaced in a first direction (e.g., towards first peripheral side 302), whereas a portion of stud S on a second side of center line L2-L2 of blade 100 is displaced in a second direction that is substantially opposite from the first direction (e.g., towards second peripheral side 304).

In this way, the material of stud S is displaced in a more controlled manner during the cutting operation of blade 100 such that stud S is not crushed or otherwise compromised. In the illustrated configuration, for example, each of first segment 306 and second segment 308 of cutting edge 104 only needs to cut through a portion of a respective back 14B of flange 14 before it can engage the corresponding side 14A. As a result, the shape of stud S is substantially preserved and/or the material of stud S is displaced in a desired direction so as to prevent jamming of cutting machine 200. By comparison, in conventional single-pointed blade designs, the cutting edge would need to cut through all of back 14B, turned end 14C, and terminal end 14D of a respective flange 14 before cutting into side 14A, which can decrease the direct contact is made with side 14A due to the likelihood that additional material becomes effectively trapped in between the blade and side 14A, Typically, the thickness of the metal forming the stud would be in the range of 27 mils to 118 mils, which equate to a gauge range of 22 to 10. However, a cutting blade and machine in accordance with the presently disclosed subject matter can be configured to cut any typical or desired thickness of stud. Typically, the metal studs comprise steel, but can also comprise any other suitable metal as might be apparent one of ordinary skill in the art upon a review of the instant disclosure.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A system for use in cutting metal studs, the system comprising:
    a metal stud comprising a web and a pair of opposed flanges, each of the pair of opposed flanges comprising a return lip that extends toward an opposing one of the pair of opposed flanges; and
    a cutting machine comprising:
        a platform configured to receive the metal stud thereon;
        a shaft that is movable relative to the platform; and
        a blade mounted to the shaft, the blade comprising a cutting edge, wherein the blade has a first end, a second end, and two peripheral sides, wherein the cutting edge is present at the first end of the blade, wherein the cutting edge proceeds in segments from the first peripheral side to the second peripheral side;
        wherein the cutting edge comprises three cutting points comprising:
            a first of the three cutting points defined by a first segment of the segments of the cutting edge that tapers away from the first peripheral side toward the first end of the blade and by a fifth segment of the segments of the cutting edge that tapers away from the first end of the blade back toward the second end of the blade and toward a medial line of the blade;
            a second of the three cutting points defined by a second segment of the segments of the cutting edge that tapers away from the second peripheral side toward the first end of the blade and by a sixth segment of the segments of the cutting edge that tapers away from the first end of the blade back toward the second end of the blade and toward the medial line of the blade; and
            a third of the three cutting points defined by third and fourth segments of the segments of the cutting edge that taper away from the first and second peripheral sides, respectively, and from the second end of the blade and toward the medial line of the blade to end at the third cutting point;
        wherein the three cutting points are configured to engage the metal stud, wherein the segments of the cutting edge are sized and positioned such that each of the first and second of the three cutting points are positioned to engage the return lip of a respective one of the pair of flanges such that the metal stud and debris from a cut of the metal stud are pushed in different directions.

2. The system of claim 1, wherein the first of the three cutting points is at a first location and the second of the three cutting points is located at a second location that is symmetrical to the first location relative to the medial line of the blade, and the third of the three cutting points is located along the medial line of the blade.

3. A method of cutting a metal stud, the method comprising:
    providing a cutting machine for use in cutting metal studs, the cutting machine comprising: a shaft; and a blade mounted to the shaft, the blade comprising a cutting edge, wherein the blade has a first end, a second end, and two peripheral sides, wherein the cutting edge is present at the first end of the blade, wherein the cutting edge proceeds in segments from the first peripheral side to the second peripheral side;
    wherein the cutting edge comprises three cutting points comprising:
        a first of the three cutting points defined by a first segment of the segments of the cutting edge that tapers away from the first peripheral side toward the first end of the blade and by a fifth segment of the segments of the cutting edge that tapers away from the first end of the blade back toward the second end of the blade and toward a medial line of the blade;
        a second of the three cutting points defined by a second segment of the segments of the cutting edge that tapers away from the second peripheral side toward the first end of the blade and by a sixth segment of the segments of the cutting edge that tapers away from the first end of the blade back toward the second end of the blade and toward the medial line of the blade; and
        a third of the three cutting points defined by third and fourth segments of the segments of the cutting edge that taper away from the first and second peripheral sides, respectively, and from the second end of the blade and toward the medial line of the blade to end at the third cutting point; and positioning a metal stud beneath the blade, wherein the metal stud comprises a web and a pair of opposed flanges, each of the pair of opposed flanges comprising a return lip that extends toward an opposing one of the pair of opposed flanges, each return lip being aligned with one of the first or second of the three cutting points;

cutting the metal stud with the blade of the cutting machine, wherein the three cutting points engage the metal stud, wherein the segments of the cutting edge are sized and positioned such that each of the first and second of the three cutting points engage the return lip of a respective one of the pair of flanges such that the metal stud and debris from a cut of the metal stud are pushed in different directions.

4. The method of claim 3, wherein the metal stud and debris being separated in the different directions preserves the shape of the stud and/or prevents jamming of the cutting machine.

5. The method of claim 3, wherein the first of the three cutting points is at a first location and the second of the three cutting points is located at a second location that is symmetrical to the first location relative to a medial line of the blade, and the third of the three cutting points is located along the medial line of the blade.

* * * * *